(12) United States Patent
Ha et al.

(10) Patent No.: US 9,086,694 B2
(45) Date of Patent: Jul. 21, 2015

(54) EMBEDDED ROBOT CONTROL SYSTEM

(75) Inventors: Young-Youl Ha, Seoul (KR);
Seong-Hun Choi, Daejeon (KR);
Min-Soo Kim, Daejeon (KR); Gap-Joo Woo, Daejeon (KR)

(73) Assignee: Samsung Heavy Ind. Co., Ltd., Seoul (KR)

( * ) Notice: Subject to any disclaimer, the term of this patent is extended or adjusted under 35 U.S.C. 154(b) by 391 days.

(21) Appl. No.: 12/779,729

(22) Filed: May 13, 2010

(65) Prior Publication Data

US 2010/0262287 A1 Oct. 14, 2010

Related U.S. Application Data

(63) Continuation of application No. PCT/KR2008/006699, filed on Nov. 13, 2008.

(30) Foreign Application Priority Data

Nov. 14, 2007 (KR) ........................ 10-2007-0115824

(51) Int. Cl.
*G05B 19/418* (2006.01)
*G05B 19/414* (2006.01)
*B25J 9/16* (2006.01)

(52) U.S. Cl.
CPC ............ *G05B 19/4141* (2013.01); *B25J 9/161* (2013.01); *G05B 2219/33342* (2013.01); *G05B 2219/34024* (2013.01)

(58) Field of Classification Search
None
See application file for complete search history.

(56) References Cited

U.S. PATENT DOCUMENTS

| | | | | |
|---|---|---|---|---|
| 3,890,552 A | * | 6/1975 | Devol et al. | 318/568.14 |
| 4,853,874 A | * | 8/1989 | Iwamoto et al. | 700/249 |
| 4,887,222 A | * | 12/1989 | Miyake et al. | 700/262 |
| 5,254,923 A | * | 10/1993 | Kanitani | 318/568.11 |
| 5,390,351 A | * | 2/1995 | Di Giulio et al. | 709/225 |
| 5,452,419 A | * | 9/1995 | Di Giulio et al. | 709/200 |
| 5,656,903 A | * | 8/1997 | Shui et al. | 318/568.1 |
| 5,943,914 A | * | 8/1999 | Morimoto et al. | 74/479.01 |

(Continued)

FOREIGN PATENT DOCUMENTS

| | | |
|---|---|---|
| JP | 1988-086636 | 4/1988 |
| JP | 1992-053331 | 2/1992 |

(Continued)

OTHER PUBLICATIONS

Japanese Office Action dated Mar. 6, 2012 for Japanese Application 2010-533962, 4 pgs.

*Primary Examiner* — Nicholas Kiswanto
(74) *Attorney, Agent, or Firm* — Brinks Gilson & Lione

(57) ABSTRACT

The present invention relates to an embedded robot control system, particularly to an embedded robot control system of a highly expandable distributed control mode. An aspect of the present invention features an embedded robot control system. In accordance with an embodiment of the present invention, the embedded robot control system, which controls a plurality of robot instruments, which have a motor and a sensor, and a robot, which is connected with the plurality of robot instruments, can include a master controller, which is installed on the robot and controls the motor and the sensor of the robot instrument, and a slave controller, which is installed on another robot, connected to the robot, or the robot instrument and receives a control signal of the motor or the sensor from the master controller and controls the motor and the sensor.

5 Claims, 4 Drawing Sheets

(56) References Cited

U.S. PATENT DOCUMENTS

| | | | |
|---|---|---|---|
| 6,330,493 B1* | 12/2001 | Takahashi et al. | 700/245 |
| 6,434,448 B1* | 8/2002 | Kosaka et al. | 700/245 |
| 6,804,580 B1* | 10/2004 | Stoddard et al. | 700/248 |
| 6,845,276 B2* | 1/2005 | Bocchi | 700/61 |
| 6,943,521 B2* | 9/2005 | Kurokawa et al. | 318/625 |
| 7,043,250 B1* | 5/2006 | DeMartino | 455/445 |
| 7,282,882 B2* | 10/2007 | Kitatsuji et al. | 318/568.11 |
| 7,330,777 B2* | 2/2008 | Hashimoto et al. | 700/247 |
| 7,443,886 B1* | 10/2008 | Gross | 370/476 |
| 7,527,205 B2* | 5/2009 | Zhu et al. | 235/462.14 |
| 7,769,934 B1* | 8/2010 | Pritchard et al. | 710/110 |
| 2004/0256963 A1* | 12/2004 | Affleck et al. | 312/209 |
| 2005/0149624 A1* | 7/2005 | Jakubiec et al. | 709/217 |
| 2005/0235070 A1* | 10/2005 | Young et al. | 710/8 |
| 2006/0161302 A1* | 7/2006 | Perry et al. | 700/245 |
| 2008/0147206 A1* | 6/2008 | Zahrai et al. | 700/19 |
| 2009/0177306 A1* | 7/2009 | Bosga et al. | 700/103 |

FOREIGN PATENT DOCUMENTS

| | | |
|---|---|---|
| JP | 1993-056178 | 3/1993 |
| JP | 1996-001574 | 1/1996 |
| JP | 1996-116333 | 5/1996 |
| JP | 1996-328628 | 12/1996 |
| JP | 1999-090881 | 4/1999 |
| JP | 2001-322078 | 11/2001 |
| JP | 2001 322078 A | 11/2001 |
| JP | 2004 276186 A | 10/2004 |
| JP | 2005-275938 | 10/2005 |

* cited by examiner

EMBEDDED ROBOT CONTROL SYSTEM

PRIORITY CLAIM

This application is a continuation and claims the benefit of priority under 35 U.S.C. §§120, 365, and 371 to Patent Cooperation Treaty Patent Application No. PCT/KR2008/006699, filed on Nov. 13, 2008. This application further claims the benefit of priority to Korean Application No. 10-2007-0115824, filed Nov. 14, 2007. The disclosures of the above applications are incorporated herein by reference in their entireties.

TECHNICAL FIELD

The present invention is related to an embedded robot control system, more specifically to a distributed control type of embedded robot control system.

RELATED ART

FIG. 1 illustrates a conventional robot control system.

Referring to FIG. 1, the conventional robot control system includes one unit of an external central control apparatus 1, an external DSP (digital signal processor) controller 2, which is installed on each of a plurality of robots 3, 4, 5 and 6, and a teaching operator 9, which is connected to each external DSP controller 2.

The external central control apparatus 1 is connected to the plurality of robots 3, 4, 5 and 6 through each corresponding external DSP controller 2 and controls the plurality of robots 3, 4, 5 and 6.

The external DSP controller 2 performs computations related to the operation of each of the robots 3, 4, 5 and 6 and controls the robots, when a control signal for the operation of the robots is received from the external central control apparatus 1 or a command is inputted in the teaching operator 9.

The DSP controller 2 handles a large number of computations for the operation of each of the robots 3, 4, 5 and 6 and thus is installed separately from the external central control apparatus 1.

In addition, each external DSP controller 2 requires a large number of relatively complex circuits 7 and 8 in order to be connected to the external central control apparatus 1.

The teaching operator 9 is connected to each of the robots 3, 4, 5 and 6 through the external DSP controller 2 and receives a command for the operation of the robots.

The conventional robot control system requires separate electronic circuits for the control of robots, inevitably increasing the size of the controller, and thus it is necessary that a plurality of controllers be used for the control of several robots. As a result, it has not been possible to mount the external central control apparatus 1 or the external DSP controller 2 on the robots 3, 4, 5 and 6.

Moreover, the large number of cables required for communication of signals between the external central control apparatus 1, the external DSP controller 2 and the robots 3, 4, 5 and 6 often cause malfunction in the robot control system, hampering the operation of the robots.

SUMMARY

Contrived to solve the above problems, the present invention provides an embedded robot control system having internal controllers that are distributed in each robot instrument.

An aspect of the present invention features an embedded robot control system. As an example only, in one embodiment, the embedded robot control system, which controls a plurality of robot instruments, which have a motor and a sensor, and a robot, which is connected with the plurality of robot instruments, can include a master controller, which is installed on the robot and controls the motor and the sensor of the robot instrument, and a slave controller, which is installed on another robot, connected to the robot, or the robot instrument and receives a control signal of the motor or the sensor from the master controller and controls the motor and the sensor.

The embedded robot control system of the present invention can dramatically reduce the number of cables, solve the problem of narrow installing space and overcome the limitation of the robot operation, by introducing an FPGA-based master controller and encompassing a serial network through the installation of an FPGA-based slave controller for each of the robot instruments distributed from the robots.

Moreover, the serial network of the embedded robot control system of the present invention can communicate in real time and automatically reconfigure itself when the network is disconnected.

Furthermore, the embedded robot control system of the present invention has a logic corresponding to a serial robot, a parallel robot and an orthogonal robot and allows the corresponding logic to be selected, enabling the operation control regardless of the kind of robot.

DETAILED DESCRIPTION OF THE PREFERRED EMBODIMENTS

Figure 1:
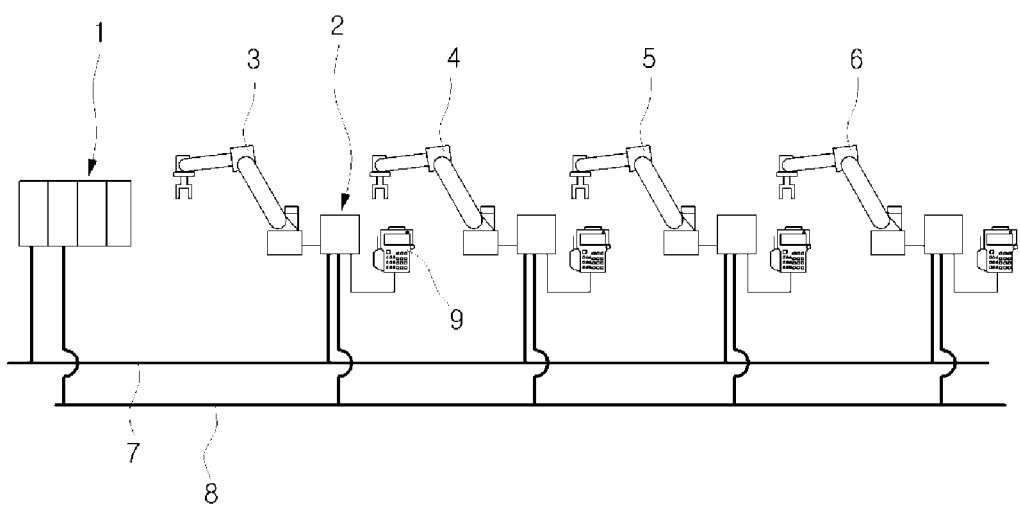
FIG. 1 is a block diagram of a conventional robot control system.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention.

Hereinafter, some embodiments will be described in detail with reference to the accompanying drawings. Identical or corresponding elements will be given the same reference numerals, regardless of the figure number, and any redundant description of the identical or corresponding elements will not be repeated.

Figure 2:
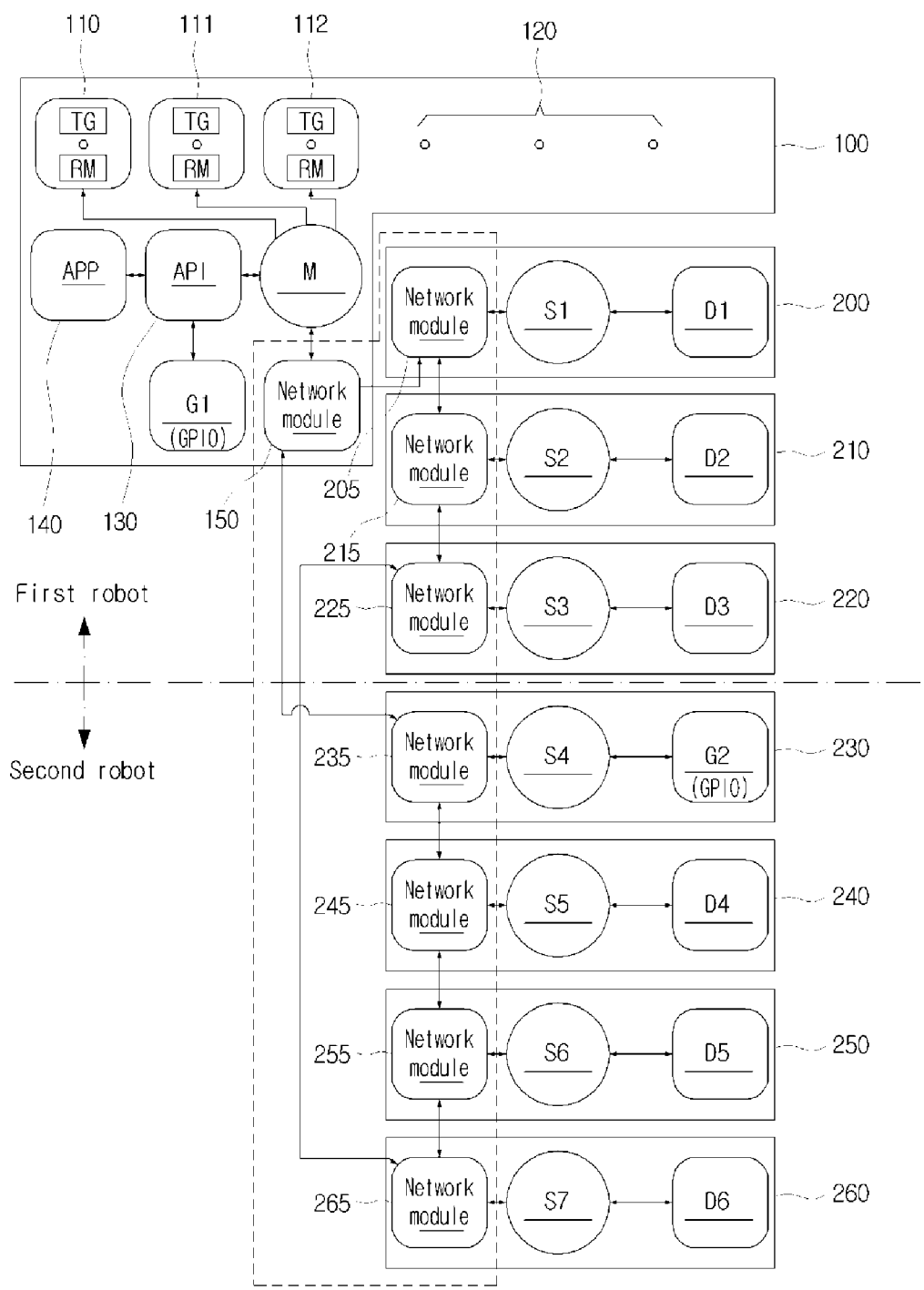
FIG. 2 is a block diagram of an embedded robot control system in accordance with an embodiment of the present invention.

FIG. 2 shows a block diagram of an embedded robot control system in accordance with an embodiment of the present invention.

Referring to FIG. 2, the embedded robot control system of the present invention includes a master controller 100 and a plurality of slave controllers 200-260, which are networked with the master controller 100.

The master controller 100 includes an FPGA (Field Programmable Gate Array), a master processor (M), a master network module 150, an input/output module 150, an application programming interface 130 and an application module 140 and handles the multiple operation control and multiple sensor control of a plurality of robot instruments.

Indicating the scope of digital control by one FPGA, the master controller 100 allows the controller of the present invention to be smaller and less power-consuming.

As a controller includes a number of semiconductor devices, the size of the controller and the power-consumption by the controller are proportional to the number of the semiconductor devices. The present invention reduces the number of semiconductor devices by allowing the FPGA to handle all digital processes needed for the control of the robots, thereby reducing the size of the controller installed in the robot instrument.

The master controller 100 uses a light kernel, such as the real-time operating system of RT-Linux, uCOS or xilkernel, to handle the multiple operation control and multiple sensor control.

The FPGA elements 110, 111 and 112 consist of a soft processor and a memory or dedicated hardware logic and computes an operation plan for the control of the robot or robot instrument. Here, an FPGA element refers to a functional element processed by one FPGA.

Here, the FPGA elements 110, 111 and 112 can be expanded to tens or hundreds of elements through, for example, a method of using an element expansion area 120 or a method of forming logic in an LUT (Look-up Table) by an SRAM (not shown). Therefore, the present invention does not restrict the number of FPGA elements 110, 111 and 112, which can be expanded or chosen according to the number, configuration, types and/or process speed of the robots.

The FPGA elements 110, 111 and 112 can easily design and/or change the logic, are relatively smaller, and generate less heat. Moreover, the FPGA elements 110, 111 and 112 are not memory-resource or CPU-resource intensive, which used to be common in mult-task operation of a DSP (digital signal processor) or a PC (personal computer), and consume less power.

The FPGA elements 110, 111 and 112 include trajectory generation modules ("TG" hereinafter) and robot kinematics modules ("RM" hereinafter) for the real-time control of the plurality of robots.

The FPGA elements 110, 111 and 112 can change the number of TGs and RMs, depending on the required process speed of the TG and RM, and thus can use the resource of the robot control system efficiently.

The TG generates a time-based trajectory of spatial movement of each robot tool coordinate system or each robot base coordinate system in a work space.

The TG can also rotate (move) the robot tool coordinate system or robot base coordinate system to respond to an external event, such as the sensor, in real time.

The RM computes the operating location of motors included in the robot, using a tool mount coordinate system and an instrument parameter (e.g., DH parameter) of the robot. Here, the tool mount coordinate system and instrument parameter are determined together with the robot tool coordinate system and robot base coordinate system, which are obtained by the TG, according to the type of robot.

The RM also computes the torque needed by each joint, using same property parameters (e.g., friction and inertia) of each link of the robots, the direction of gravity and external forces applied to the robots.

The RM sends a target location among the computed operation locations and a target torque among the computed torques of the motors to each motor driver through the network. Here, the target location and the target torque are used for a feed forward control of each motor.

The RM can also compute a coordinate system on the current work space, based on the operating locations of the motors included in the robots.

The master processor (M) is connected to each of the FPGA elements 110, 111 and 112 and generates a control signal for operating a motor and a plurality of sensors in accordance with an operation plan of the robot instrument. The master processor also manages the operation status of the robot instrument, which is operated through the control signal.

In other words, the master processor (M) runs a program in work units such as the operation plan and monitors, for example, operation errors.

The master processor (M) also handles connection management between the FPGA elements 110, 111 and 112, monitoring management and input/output management.

Moreover, the master processor (M) controls the communication of signals between each of the slave controllers 200-260 and the FPGA elements 110, 111 and 112, as the master processor is connected to the master network module 150 to handle the communication.

Furthermore, the master processor (M) is connected to the application module (APP) 140 through the application programming interface (API) 130.

The application module 140 includes application programs for robot operating logic and robot resetting operation (e.g., calibration) and other robot-related application programs that are preconfigured for each of the serial robots, parallel robots and orthogonal robots. Here, the robot operating logic is activated in accordance with the selection of logic by a user, and, according to a corresponding trajectory generation module, controls in real time the movement of trajectory among the control and movement of the robot in the work space where the plurality of robot instruments are operated The application programming interface 130 is connected to a general purpose input output (GPIO), represented by G1 in FIG. 2, which handles the input and output of various sensors or the input and output of various signals. For example, the GPIO is connected to the robot instrument of a first robot and its various surrounding sensors.

The master network module 150 handles the communication with slave network modules 205, 215, 225, 235, 245, 255 and 265, which are installed in the slave controllers 200-260, through the cables. The slave network modules 205, 215, 225, 235, 245, 255 and 265 also communicate with one another through the cables.

Here, it is preferable that the master network module 150 and the slave network modules 205, 215, 225, 235, 245, 255 and 265 have a plurality of communication ports, which comply with the pertinent communication standard, for expanded connection of cables.

The master network module 150 and the plurality of slave network modules 205, 215, 225, 235, 245, 255 and 265 form a serial network through the cables. This allows for relatively smaller, simpler cable configuration of the present invention over the related art.

The slave controllers 200-260 includes slave processors S1-S7, slave network modules 205, 215, 225, 235, 245, 255 and 265 and motor drivers D1-D6 for driving the motors. It is possible that the slave controllers 200-260 further have a GPIO (G2), which inputs and outputs various signals to and from the robot instrument of a second robot and its surrounding sensors.

The slave controllers 200-260 realizes distributed control of the plurality of robots and the robot instrument, by linking with the master controller 100 through the corresponding slave network modules 205, 215, 225, 235, 245, 255 and 265 and the master network module 150.

The slave processors S1-S7 is connected by the corresponding slave network modules 205, 215, 225, 235, 245, 255 and 265 to be linked with the FPGA elements 110, 111 and 112 of the master controller 100.

The slave processors S1-S7 are manufactured based on the FPGA.

The slave processors S1-S7 are connected with the corresponding motor drivers D1-D6 or the GPIO (G2).

The slave network modules 205, 215, 225, 235, 245, 255 and 265 are connected to the master network module 150 to communicate a signal for linking with the master controller 100.

The slave network modules 205, 215, 225, 235, 245, 255 and 265 can realize the real-time communication and be automatically reconfigured when the network is disconnected, by realizing a network technology, in which the master network module 150 and the 7 levels of OSI (open system interconnection) are modified for the present invention.

Each of the motor drivers D1-D6 is connected to each of the slave processors S1-S6, respectively, to drive the motor.

The motor drivers D1-D6 can handle the servo control of each motor in accordance with the target location and target torque received from the RM of the master controller 100. It is also possible that the servo control of each motor is handled independently.

Therefore, the motor drivers D1-D6 monitor the driver input voltage, the driver input current, the current applied to each motor and an absolute or relative encoder value of each motor. The motor drivers D1-D6 are also capable of performing the switching operation of each motor and have limiting and braking functions for the control of each motor.

The GPIO (G2) handles the input and output of a digital or analog sensor.

The GPIO (G2) is connected with the robot instrument of the second robot and its surrounding various sensors.

As illustrated in the embedded robot control system of FIG. 2, in case one master controller 100 and a plurality of slave controllers 200-260 are installed in two robots, that is, the first robot and the second robot, the master controller 100 and three slave controllers 200, 210 and 220, which are connected for serial communication, can be installed in the first robot, and the remaining four slave controllers 230, 240, 250 and 260 can be installed in the second robot.

Figure 3:
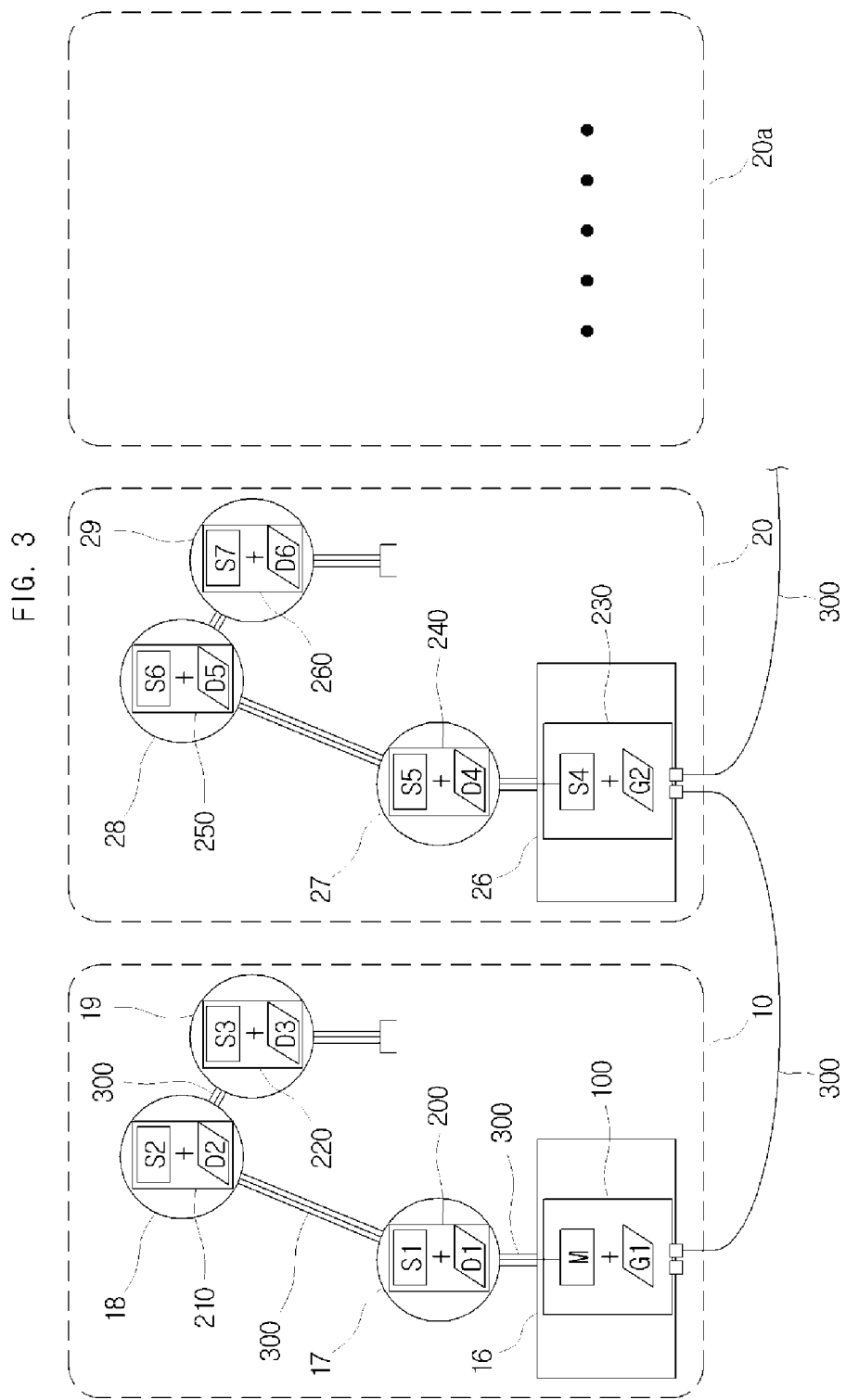
FIG. 3 is an arrangement plan of a first robot and a second robot, in which the embodiment of FIG. 2 is installed.

FIG. 3 illustrates an example of how an embedded robot control system is installed in a first robot and a plurality of second robots in accordance with an embodiment of the present invention.

Referring to FIG. 3, the master controller 100 is installed at a base such that the master controller 100 can be connected to a robot instrument 16 of a first robot 10.

Later, the slave controllers 200, 210 and 220 are installed such that each of the slave controllers 200, 210 and 220 is connected to each of robot instruments 17, 18 and 19, respectively, which are distributed in the first robot 10.

The master controller 100 is connected with the first slave controller 200 through the cable 300, and the following two slave controllers 210 and 220 are successively connected through the cable 300.

This way, the master controller 100 forms a serial network with the three slave controllers 200, 210 and 220 through the use of a very small quantity of cable 300, thereby enabling a distributed, smaller structure over the conventional robot control system.

Likewise, the remaining four slave controllers 230, 240, 250 and 260 are installed in the second robot 20 and connected to the corresponding robot instruments 26, 27, 28 and 29 in the same manner of the master controller 100 and corresponding slave controllers 200, 210 and 220.

It is possible that a separate second robot 20a is configured through the same internal configuration and method as the second robot 20 and that the connection is expanded as long as the serial communication standard is met and the master controller 100 can handle.

The master controller 100 of the first robot 10 and the fourth slave controller 230 of the second robot 20 are connected to each other through the serial network cable 300, and it is also possible that the separate second robot 20a is connected to the second robot 20 through the cable 300.

Figure 4:
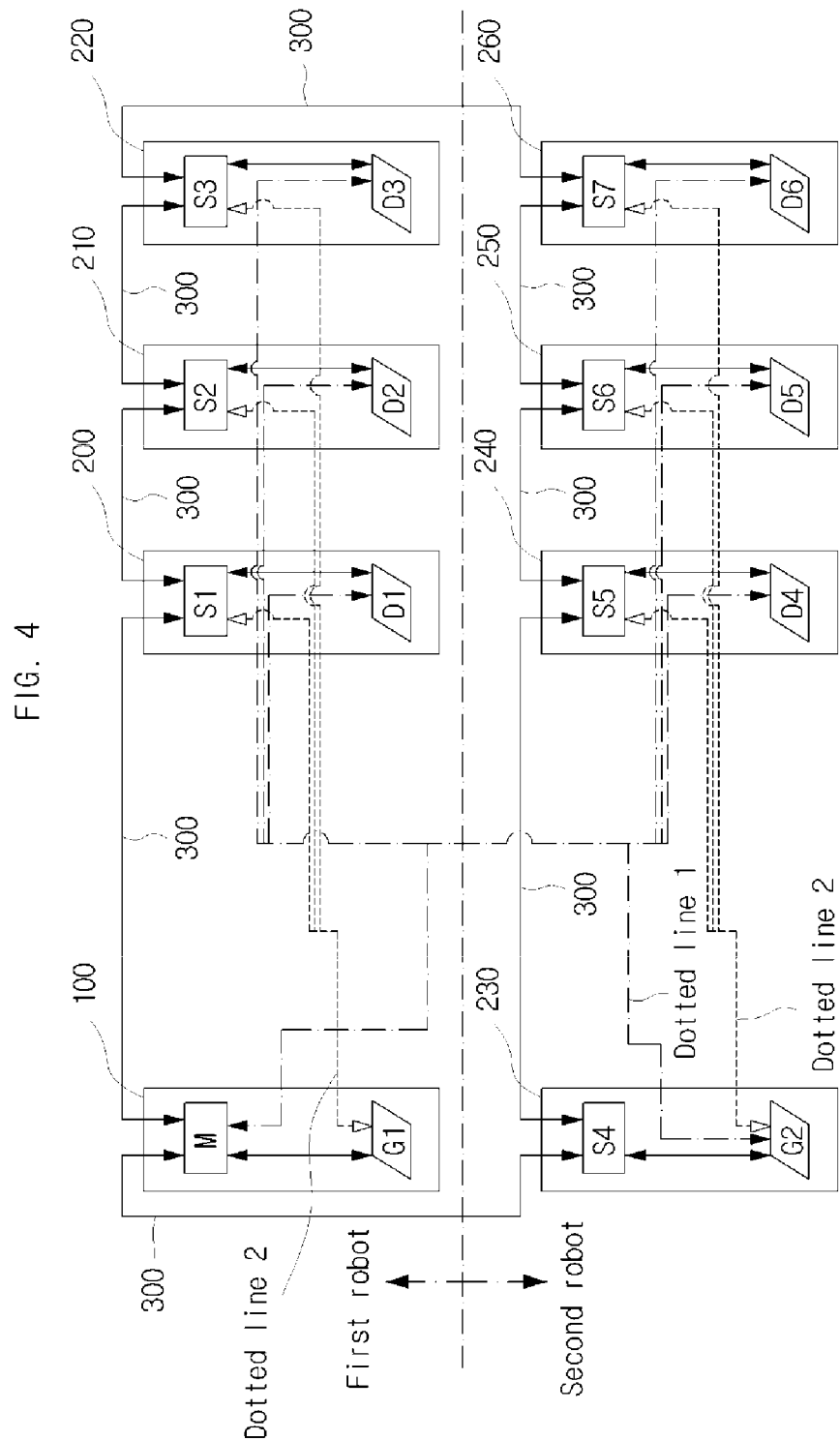
FIG. 4 is a block diagram for illustrating the relation of network connection between elements shown in FIG. 3.

FIG. 4 is a block diagram for illustrating the network connection between the elements shown in FIG. 3.

As shown in FIG. 4, the master controller 100 is not only connected physically with other elements through the cable 300 but also linked logically with each of the motor drivers D1-D6 and the GPIO (G2), as indicated with dotted lines 1.

Moreover, the slave processors S1-S7 can directly control the GPIOs (G1 and G2) through dotted lines 2, in order to respond to emergency situations occurred during the operation of the robots.

Since the master controller 100 is logically linked with the GPIOs (G1 and G2), and the slave processors S1-S7 are also logically linked with the GPIOs (G1 and G2), the plurality of slave controllers 200-260 can be controlled.

Furthermore, the master controller 100 and the slave controllers 200-260 are formally or physically connected through the cable 300, by the ring topology form.

For example, the master network module 150 and the slave network modules 205, 215, 225, 235, 245, 255 and 265 are configured in a full-duplex mode (i.e., transmission and reception being separated).

In case there is a disconnection or short circuit in any cable 300, the master network module 150 receives information on the disconnected or short-circuited cable from one of the slave network modules 205, 215, 225, 235, 245, 255 and 265 that is related to the pertinent cable.

In this case, the master network module 150 and all slave network modules 205, 215, 225, 235, 245, 255 and 265 switch to a line topology form from the ring topology form to continue to operate the full-duplex mode in the case of disconnection or short-circuit of some cable.

That is, through data transmission route change information received from the slave network modules 205, 215, 225, 235, 245, 255 and 265, the master network module 150 can send the data, which was transmitted through one route, through two routes, enabling the communication without any interruption in the system.

When the disconnected or short-circuited cable is returned to the normal condition, the master network module 150 receives information on the normalization from the slave network modules 205, 215, 225, 235, 245, 255 and 265, enabling the transmission of the data through one route again. That is, the line topology form can be switched back to the ring topology form.

While the invention has been described with reference to an embodiment shown in the drawings, the embodiment is for illustrative purposes only and shall not limit the invention. It is to be appreciated that those skilled in the art can change or modify the embodiment without departing from the scope and spirit of the invention. As such, many embodiments other than that set forth above can be found in the appended claims.

We claim:

1. An embedded robot control system configured to control a plurality of robot instruments of one or more robots, the robot instruments comprising a motor and a sensor, the one or more robots being connected with the plurality of robot instruments, the embedded robot control system comprising:

a master controller, being installed on a first robot and configured to generate a control signal for controlling the motor and the sensor of the robot instruments;

a first slave controller, being installed on the first robot, the first slave controller being connected to one of the robot instruments of the first robot, configured to receive the control signal from the master controller and to control the motor and the sensor and to transfer the control signal to one of a plurality of second slave controllers; and the plurality of second slave controllers, being installed on the first robot or a second robot, each of the plurality of the robot instruments of the first robot or each of the plurality of the robot instruments of the second robot being respectively connected by one of the second slave controllers and configured to receive the control signal of the motor and the sensor from the first salve controller or another one of the second slave controllers and to control the motor and the sensor and to transfer the control signal to yet another one of the slave controllers, wherein the master controller, the first slave controller and the second slave controllers are serially connected, wherein the master controller further comprises:

an FPGA (Field Programmable Gate Array) element configured to compute an operation plan for control of the other robot or the robot instrument;

a master processor configured to generate a control signal for operating the motor and the sensor in accordance with the operation plan;

a master input/output configured to input and output a signal to and from the sensor; and a master network module configured to output the control signal, wherein the master controller further comprises an application module having an application program for robot operating logic through an application programming interface.

2. The embedded robot control system of claim 1, wherein the FPGA element comprises a trajectory generation module and a robot kinematics module, the trajectory generation module configured to generate a movement trajectory of the other robot or the robot instrument, the robot kinematics module configured to compute an operation location of the motor.

3. The embedded robot control system of claim 1, wherein the slave controller comprises:

at least one slave network module configured to communicate with the master controller;

a slave processor configured to receive a control signal of the motor and the sensor from the master controller through the slave network module and to control the motor and the sensor; and a motor driver configured to control the corresponding motor in accordance with the control signal.

4. The embedded robot control system of claim 1, further comprising a slave input/output module configured to input and output a signal to and from the sensor.

5. The embedded robot control system of claim 1, wherein:

the master controller and the slave controller are connected to each other through a cable in a ring topology form; and in case of disconnection or short-circuit in the cable, the ring topology form is switched to a line topology form to handle a full-duplex mode of communication.

* * * * *